May 5, 1959  J. A. THIEL  2,885,169
CONDUIT HOLDERS FOR USE IN SUPPORTING ELECTRICAL
CONDUIT, ARMORED CABLE AND THE LIKE
Filed May 10, 1956
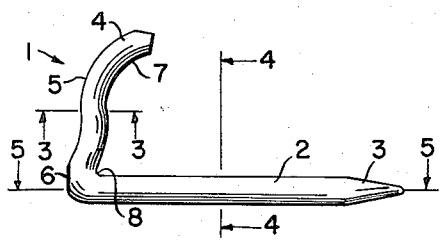
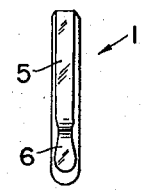
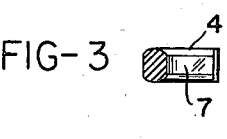
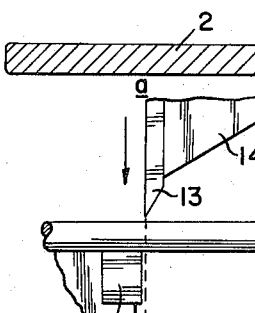
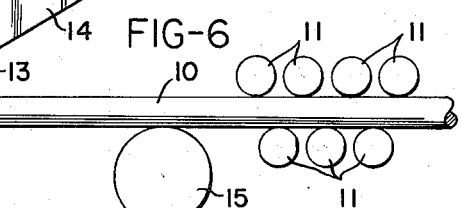
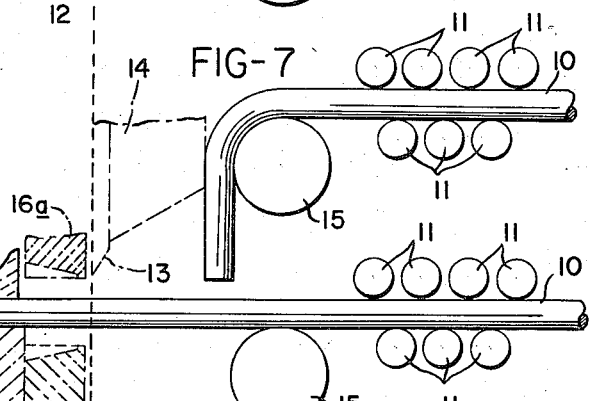
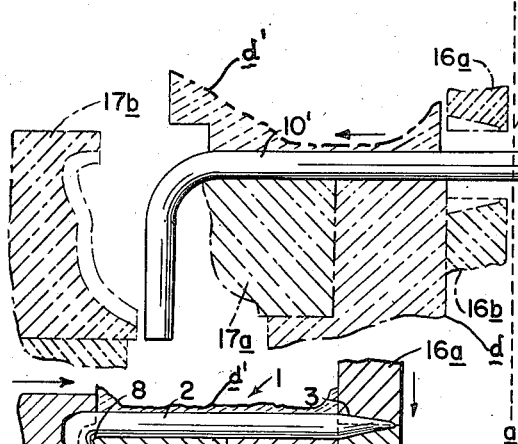
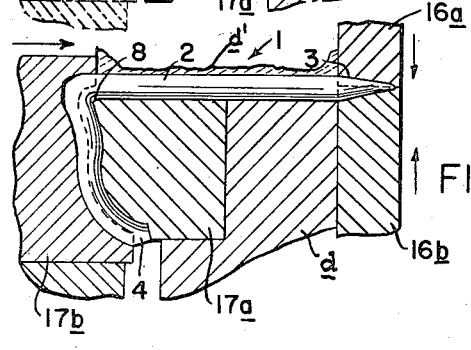
INVENTOR.
JOSEPH A. THIEL
BY *Alfred W. Petchaft*
ATTORNEY United States Patent Office 2,885,169
Patented May 5, 1959

2,885,169

CONDUIT HOLDERS FOR USE IN SUPPORTING ELECTRICAL CONDUIT, ARMORED CABLE AND THE LIKE

Joseph A. Thiel, St. Louis County, Mo.

Application May 10, 1956, Serial No. 584,145

5 Claims. (Cl. 248—71)

This invention relates in general to certain new and useful improvements in conduit holders for use in supporting electrical conduit, armored cable and the like.

When installing electrical wiring in homes, buildings, industrial plants and the like, it is usually necessary to support the armored cable or conduit by some type of hanger, stapler or similar device which is hammered into the joists or studding. Numerous devices of this type have, from time to time, been developed such as cast hanger-nails which are expensive and brittle, hanger-hooks which are stamped from flat sheet metal and, tend to split the wood into which they are driven. Furthermore, most such devices are relatively weak and readily bend, cock, or distort when driven with hammer-blows which are not entirely square and straight.

It is, therefore, the primary object of the present invention to provide a conduit holder having a rugged nail-like shank which is, therefore, easy to drive and does not readily tend to split the wood into which it is being driven.

It is another object of the present invention to provide a conduit holder of the type stated which has a uniquely formed conduit-engaging element and will therefore retain its shape against substantial distortional forces such as improperly directed hammer-blows and the like.

It is a further object of the present invention to provide a conduit holder of the type stated which readily lends itself to high-speed manufacture in continuous automatic production machinery and is therefore extremely economical in cost.

It is also an object of the present invention to provide a novel and economical method for producing conduit holders having the inherent characteristics above set forth.

With the above and other objects in view, my invention resides in the novel features of form, construction, arrangement, and combination of parts presently described and pointed out in the claims.

In the accompanying drawings:

Figure 1 is a side elevational view of a conduit holder constructed in accordance with and embodying the present invention;

Figure 2 is an end elevational view of the conduit holder;

Figures 3, 4 and 5 are sectional views taken along lines 3—3, 4—4, and 5—5, respectively of Figure 1; and Figures 6, 7, 8 and 9 are diagrammatic views illustrating the three major steps or forming operations constituting the method of the present invention.

Referring now in more detail and by reference characters to the drawings which illustrate a preferred embodiment of the present invention, 1 designates a conduit holder formed of steel wire of suitable gauge and integrally comprising a shank 2 provided at one so-called forward end with a driving-point 3 and at its other or rear end with a conduit-engaging element or hook 4. As will be seen by reference to Figures 2 and 4, the hook 4 is flattened along its outwardly presented face, to provide an arcuate face 5 which is of somewhat cylindrical contour and an impact shoulder 6 which is substantially perpendicular to the longitudinal axis of the shank 2. Similarly the outwardly presented face of the hook 4 is flattened along the outer portion of its length in the provision of a conduit-gripping face 7 which is also of somewhat cylindrical contour. Finally the metal between the hook 4 and shank 2 is cold-worked, as a part of the forming procedure, to provide an intermediate somewhat thickened oblique connecting neck 8 which resists accidental distortion in case the impact shoulder 6 or any part of the hook is struck by a hammer-blow which is improperly or inaccurately directed. In addition to this the conduit-gripping surface 7 insures snug-fitting retentive contact with the conduit or armored cable for which the conduit holder 1 is designed and also contributes material to the distortion-resisting characteristic inherent in conduit holders of the present invention. The flattening of the outwardly presented and inwardly presented faces of the hook 4, as shown in Figures 3 and 4, also achieves an additional measure of cold working, or cold forging, as it is sometimes called, so that the metal within the S-shaped hook is rendered less malleable, or in other words, more distortion resistant to accidental hammer-blows. It should, of course, be understood in this connection that conduit and armored cable are made in standard sizes and accordingly the conduit holders of the present invention can be accurately designed in matching sizes.

The conduit holders 1 are preferably manufactured in a high-speed automatic machine of the punch-press type using a series of progressive dies operating to perform the sequence of steps diagrammatically shown in Figures 6, 7, 8 and 9. The wire stock 10 is continuously fed in through conventional straightening rolls 11 and over a cut-off anvil 12. In the relative position indicated by the line a—a, a cut-off blade 13 and forming wiper 14 come down and sever the wire stock 10 and form the oncoming end with a quarter-bend around a suitable former 15 as shown in Figure 7. On the next stroke the wire stock 10 is advanced to the position shown in Figure 8. Thereupon as the forming machinery makes its next stroke, the cut-off forward portion 10' of the wire stock 10 is clamped between hold-down dies d, d' and is finally shaped by the dies 16ª, 16ᵇ and 17ª, 17ᵇ which move in the directions shown by the respective directional arrows in Figure 9. At the same time the oncoming end of the next succeeding portion of the wire stock 10 is being formed to a quarter-bend around the former 15. Consequently, on the second stroke a completed conduit holder 1 is formed and an identical conduit holder 1 is thereafter formed on each succeeding stroke.

It should be understood that changes and modifications in the form, construction, arrangement, and combination of the several parts of the conduit holders for use in supporting electrical conduit, armored cable and the like may be made and substituted for those herein shown and described without departing from the nature and principle of my invention.

Having thus described my invention, what I claim and desire to secure by Letters Patent is:

1. A conduit holder formed of normally malleable metal and comprising a straight shank of substantially circular cross-sectional shape, said shank being pointed at its forward end and being integrally provided, at its rear end, with a reversely bent connection portion which extends laterally outwardly and forwardly at an oblique angle with respect to the shank and merges arcuately into a relatively large forwardly curved hook, all portions of which are located forwardly with respect to the rear end of the shank, said rear end of the shank and the connection portion being cold-worked at the region of juncture therebetween, the rear end of the shank being flattened to provide an impact-receiving surface and the underside of said region of juncture is deformed in the provision of a localized zone of hardness between the connection portion and the rear end of the shank in such region of juncture.

2. A conduit holder as defined in claim 1 and further characterized in that the rearwardly presented arcuate face of the hook is flattened.

3. A conduit holder as defined in claim 1 and further characterized in that the forwardly presented arcuate face of the hook is flattened.

4. A conduit holder as defined in claim 1 and further characterized in that the rearwardly presented and forwardly presented faces of the hook are flattened to provide substantially parallel surfaces.

5. A conduit holder formed of normally malleable metal comprising a straight shank of substantially circular cross-sectional shape, said shank being pointed at its forward end and being integrally provided, at its rear end, with a reversely bent connection portion which extends laterally outwardly and forwardly at an oblique angle with respect to the shank and merges arcuately into a relatively large forwardly curved hook, all portions of which are located forwardly with respect to the rear end of the shank, said rear end of the shank and the connection portion being cold-worked at the region of juncture therebetween, the rear end of the shank being flattened to provide an impact-receiving surface and the underside of said region of juncture is deformed in the provision of a small somewhat flattened surface extending angularly cross-wise between the rear end of the shank and the interior surface of the connection portion thereby forming a localized zone of hardness between the connection portion and the rear end of the shank in such region of juncture.

References Cited in the file of this patent

UNITED STATES PATENTS

| | | |
|---|---|---|
| 358,709 | Weeks | Mar. 1, 1887 |
| 934,686 | Miller | Sept. 21, 1909 |
| 1,109,568 | Flagge | Sept. 1, 1914 |
| 1,579,071 | Braddock | Mar. 30, 1926 |
| 1,735,939 | St. John | Nov. 19, 1929 |
| 2,199,436 | Lazarides | May 7, 1940 |
| 2,365,971 | Rachlin | Dec. 26, 1944 |
| 2,365,972 | Rachlin | Dec. 26, 1944 |
| 2,568,027 | Rachlin | Sept. 18, 1951 |

FOREIGN PATENTS

| | | |
|---|---|---|
| 251,013 | Great Britain | Apr. 21, 1926 |